United States Patent
Minsky

(10) Patent No.: US 11,339,000 B1
(45) Date of Patent: May 24, 2022

(54) METHOD AND SYSTEM FOR STOCKING AND ASSEMBLING SKUS

(71) Applicant: Ranen Minsky, Brooklyn, NY (US)

(72) Inventor: Ranen Minsky, Brooklyn, NY (US)

( * ) Notice: Subject to any disclaimer, the term of this patent is extended or adjusted under 35 U.S.C. 154(b) by 243 days.

(21) Appl. No.: 16/260,077

(22) Filed: Jan. 28, 2019

Related U.S. Application Data

(60) Provisional application No. 62/623,483, filed on Jan. 29, 2018.

(51) Int. Cl.
  *B65G 1/137* (2006.01)
  *G06K 7/14* (2006.01)
  *G06Q 10/08* (2012.01)

(52) U.S. Cl.
  CPC ......... *B65G 1/1376* (2013.01); *G06K 7/1413* (2013.01); *G06Q 10/0875* (2013.01); *B65G 2203/0216* (2013.01)

(58) Field of Classification Search
  CPC .................. B65G 2203/0216; B65G 1/1376
  See application file for complete search history.

(56) References Cited

U.S. PATENT DOCUMENTS

| | | | | |
|---|---|---|---|---|
| 3,247,929 | A * | 4/1966 | Langley | B65G 1/1376 186/56 |
| 5,363,310 | A * | 11/1994 | Haj-Ali-Ahmadi | B65G 1/137 414/273 |
| 6,971,833 | B1 * | 12/2005 | Freudelsperger | B65G 1/0407 414/268 |
| 9,486,926 | B2 * | 11/2016 | Kawano | B65G 43/08 |
| 2017/0020302 | A1 * | 1/2017 | Goehring | A47F 1/125 |
| 2017/0291768 | A1 * | 10/2017 | Starks | B65G 1/1376 |
| 2018/0085788 | A1 * | 3/2018 | Engel | B65G 1/1373 |
| 2018/0134492 | A1 * | 5/2018 | Lert, Jr. | G06Q 30/0643 |
| 2019/0164098 | A1 * | 5/2019 | Setchell | G06Q 30/0224 |

* cited by examiner

*Primary Examiner* — Charlie Y Peng
(74) *Attorney, Agent, or Firm* — Michael J. Feigin, Esq.; Feigin and Fridman LLC

(57) ABSTRACT

A method and system for stocking and assembling SKUs includes stocking SKUs out of a lane, from the back of a downward slanting shelf, unit by unit, in long, narrow, single files separated by dividers, and with supplementary storage space available nearby. In addition it includes picking SKUs for multiple orders simultaneously off of shelves and onto a conveyor, registering all SKUs riding on the conveyor, and sorting and packing SKUs upon receiving notifications to do so as they ride on the conveyor. All coordinated such that after being brought to the stocking lane or supplementary storage space, SKUs are stocked into the shelves, picked off of the shelves and onto the conveyor, and then registered as riding on the conveyor, at which point timed notifications lead SKUs riding on the conveyor to be sorted and packed into orders which are then confirmed as being complete.

16 Claims, 7 Drawing Sheets

METHOD AND SYSTEM FOR STOCKING AND ASSEMBLING SKUS

BACKGROUND OF THE INVENTION

1. Field of the Invention

The present invention is in the field of inventory management systems and pertains particularly to a method and system for stocking and assembling Stock Keeping Units (SKUs) within a warehouse setting.

2. Description of Related Art

Methods and systems by which existing inventory management systems stock and assemble SKUs exhibit one or more of the following limitations. They may be relatively slow. They may require a relatively large amount of space. They may be relatively expensive to setup or operate. They may be relatively error-prone. They may be relatively unable to scale, as the order sizes, order frequencies, or SKU mixes change.

Therefore, what is clearly needed is a method and system for stocking and assembling SKUs that solves the problems mentioned above.

SUMMARY OF THE INVENTION

In one embodiment of the invention a method and system for stocking and assembling SKUs is provided, comprising of stocking SKUs out of a lane, from the back of a downward slanting shelf, unit by unit, in long, narrow, single files separated by dividers, with supplementary storage space available ten or less feet away from behind the lane and where SKUs may be freely stocked including from within the cases in which they were originally brought in to the warehouse; picking SKUs for multiple orders simultaneously off of shelves and onto a conveyor, resulting in SKUs from different orders being mixed up together while riding on the conveyor; scanning or otherwise registering all SKUs riding on the conveyor; sorting and packing SKUs upon receiving notifications to do so as they ride on the conveyor; all characterized in such a way that after being brought to the stocking lane or supplementary storage space, SKUs are stocked into the shelves, picked off of the shelves and onto the conveyor, and then scanned or otherwise registered as riding on the conveyor, at which point timed notifications lead SKUs riding on the conveyor to be sorted and packed into orders which, thanks to the different steps being coordinated with each other under a centralized server, are then confirmed as being fully assembled.

Also in one embodiment most SKUs are oriented with their smallest face facing vertically towards the front of the shelves when stocked. Also in one embodiment SKUs slide down the shelves without recourse to any wheeled system, but off of the surface of the shelves themselves or any other flat materials overlaying them. Also in one embodiment stockers are guided as to what SKUs to replenish and are able to input whether they successfully replenished the SKUs thanks to a software application running on a smartwatch attached to their body or clothing. Also in one embodiment stockers seamlessly cross different temperature zones. Also in one embodiment SKUs ride directly on the conveyor belt. Also in one embodiment the location of pickers is tracked at regular intervals throughout the course of the picker's cycle, triggering bays further along the pickers' path to activate picking signals for SKUs encompassing the very latest submitted orders, and triggering bays behind the pickers' path to be turned off and reset. Also in one embodiment pickers walk in circles around the conveyor spaced more or less evenly apart from each other. Also in one embodiment pickers seamlessly cross different temperature zones within a single picking cycle. Also in one embodiment the picking signals comprise of LED strips with individually controllable LEDs which light up in different colors under a summation system to indicate which SKUs to pick off of the shelves and in what quantities. Also in one embodiment the LED strips further comprise trailing animations to draw pickers' attention. Also in one embodiment the warehouse as embodied in FIG. 1 fits within a 4,000 square foot space. Also in one embodiment orders are submitted by customers shopping in a retail store in real-time. Also in one embodiment the SKUs comprise of grocery items which include liquid and semi-solid items as well as circular and fragile items. Also in one embodiment the average size of orders packed by packers average 8 or more different SKUs. Also in one embodiment weight sensors track the weights resting on the packers' platforms and compare any weight changes to the weight changes anticipated from the packers' actions, to evaluate whether the packers' successfully complete their tasks. Also in one embodiment packers can request SKUs to be re-picked.

BRIEF DESCRIPTION OF THE SEVERAL VIEWS OF THE DRAWINGS

Note: For simplicity of illustrations, bearings, nuts, bolts, screws, washers, steel bars and angles perforated with holes or otherwise, wires, wire connectors, cables, zip ties, glues, drill presses, angle grinders, microcontrollers, and other minutiae common warehouse hardware are not depicted, as they are known to those with skill in the art. When they are shown, it is purely for illustrative purposes and not intended to capture all embodiments of the invention disclosed.

DETAILED DESCRIPTION OF THE INVENTION

Note: The term "stocker" refers to a user within the warehouse who replenishes inventory and performs other related stocking functions. The term "picker" refers to a user within the warehouse who removes or "picks" SKUs off of shelves and places them onto a conveyor and performs other related picking functions. The term "packer" refers to a user within the warehouse who removes SKUs off of a conveyor and places them onto a platform for order bagging and performs other related packing functions.

The inventor provides a method and system for stocking and assembling SKUs into orders within a warehouse setting. The present invention is described in enabling detail in the following examples, which may represent more than one embodiment of the present invention.

Figure 1:
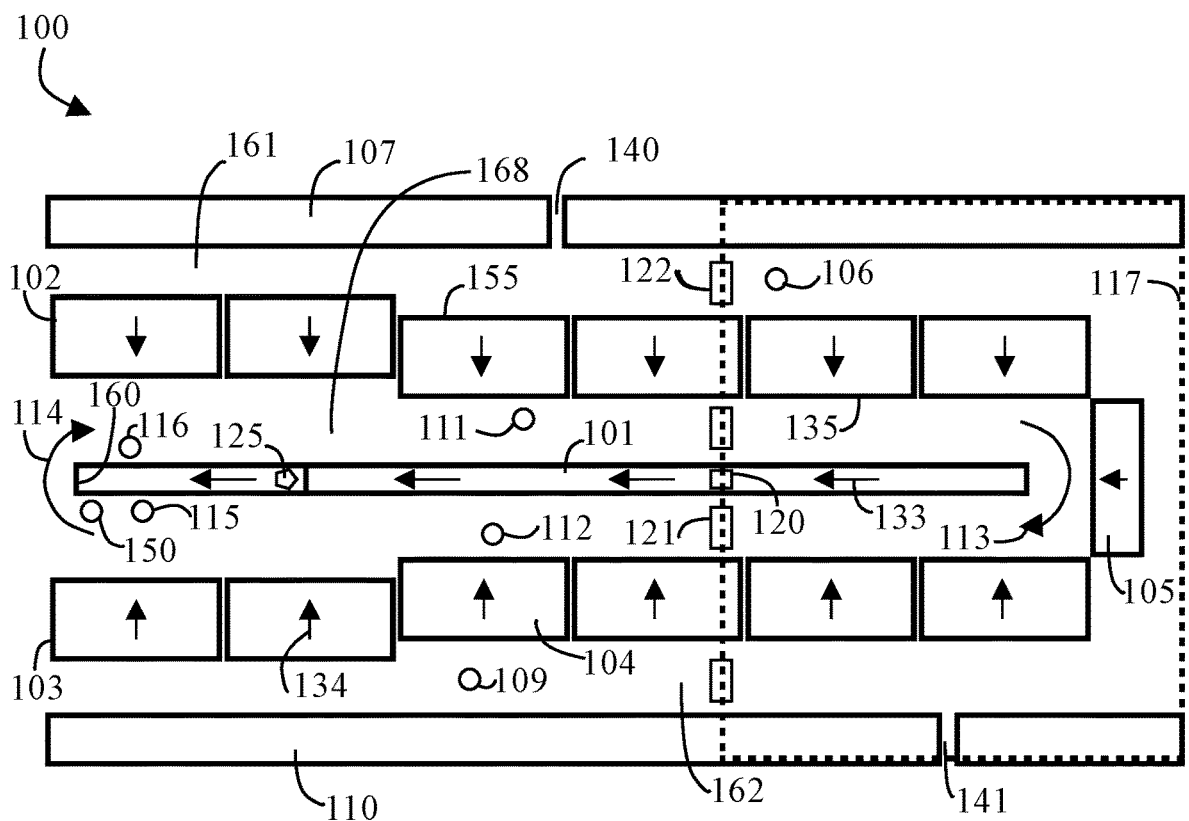
FIG. 1 is a top view of the layout of a warehouse according to an embodiment of the present invention.

FIG. 1 is an embodiment of the layout of a warehouse 100. In this example, a 12 in wide, 42 ft long slider-bed conveyor 101 is arranged in the middle and along the length of the warehouse. Its belt travels from left to right 133 705 towards the outside of the surrounding U-shaped shelving 102 103 104 105, at a speed of 150 ft per minute along the first 31 ft of the conveyor, and thanks to a variable speed controller, at a slower speed of between 20 and 80 ft per minute along the last 11 ft of the conveyor. The speed differential may be achieved through installing a gapper conveyor, or by placing two separate conveyors at a 180 angle from each other where the faster conveyor discharges onto the slower conveyor. In other embodiments, a bed over roller, powered roller, an Intralox Activate Roller Belt (ARB), or other conveyor system may be used, and the conveyor may travel at more than two different speeds or at just one speed throughout. In addition, in other embodiments, the conveyor(s) may form a circular loop or a rectangle or any other shape, be located elsewhere or oriented differently within the warehouse, and may travel in one or more different directions.

In this embodiment, a shelving system 102 103 104 105 comprising of multiple Eft-long bays 102 103 104 105 500 is arranged along three sides 102 103 105 of the conveyor with their front sides 135 facing the conveyor and about three feet away from it. Supplementary storage space 107 110 which may consist of further shelving is available about 3 ft behind the aforementioned shelves 102 103 104 105. In other embodiments, some of the shelves or part of the supplementary storage space may consist of refrigerators, open case coolers, freezers, or freezer chests.

In this embodiment, stockers 106 109 freely roam through the roughly 3 ft wide stocker lanes 161 162 between the shelves 102 103 104 105 and the supplementary storage space 107 110, replenishing inventory from the latter 107 110, possibly out of the cardboard boxes or other cases in which the inventory was originally brought in, and into the former 102 103 104 105, with or without the help of a utility cart, hand truck, U-boat platform truck or other material handling tool. Occasionally, there may be gaps 140 141 within the supplementary storage space so as to allow hand trucks and other material handling tools to be parked or stored without encumbering the stocker lanes 161 162. Any leftover SKUs which cannot fit into their reserved shelf 102 103 104 105 canals 616 may be stocked in the supplementary storage space 107 110 right opposite.

In this embodiment, pickers 111 112 spaced loosely equidistantly from each other, walk along the picking lane 168, always in the same clock-wise 113 114 or alternatively counter-clockwise direction around the conveyor 101, removing SKUs 501 502 605 614 off of the shelves 102 103 104 105 503 608 603 and placing them onto the conveyor 101. Seeing as most users are right-handed, walking in the clockwise direction specifically 113 114, such that shelves are to the pickers' left sides, may allow for SKUs 501 502 605 614 to be removed more easily when reaching in for them with the right hand. In another embodiment, pickers are each allocated a section of shelving bays 102 103 104 105 500 along which they walk back and forth, picking SKUs as they go in either direction, and where the server 412 deduces in which direction they may be walking, activating picking signals 610 607 accordingly, by observing the string of previously triggered trip sensors 403 509.

In this embodiment, packers 115 116 150 are stationed near the end of the conveyor 101, with a platform 709 and a tablet 708 or computer monitor 1901 beside them, removing SKUs 704 off of the conveyor 101 703 and onto their platforms 709 upon being notified to do so through the stocker software application 312 405 707.

In this embodiment, a scanner or other barcode reader or SKU identification device 125 is placed along the conveyor 101, detecting and registering all SKUs 704 riding on the conveyor 101 and passing by 133. The first packer in the line of packers, that is to say, the one 115 furthest away from the end 160 of the conveyor 101, manually scans all SKUs as they approach him. In other embodiments, the scanning may be entirely automated using for example Datalogic's Jade X7 scanner or a set of Datalogic Matrix 410 scanners, so long as it occurs ahead 125 of the first packer 115. Alternatively, a user placed in front 125 of the first packer 115 may be charged exclusively with scanning SKUs as they pass by.

In this embodiment, unpacked SKUs, whether due to the their having been needlessly picked by a picker 102 111 or overlooked by a packer 115 116 150 who failed to pack them 315 or otherwise, accumulate at the end of the conveyor 160, whether by continually hitting against a barrier half an inch above the conveyor that they can't go past or through their being discharged onto a separate platform right beside the end 160 of the conveyor or otherwise.

In this embodiment, part of the warehouse is enclosed with heat insulation 117 such as US Cooler polystyrene or R Max polyisocyanurate, which thanks to a set of condensers and compressors or other temperature control systems, creates a walk-in cooler within that space. Dress curtains 121 122 are installed to facilitate access between the walk-in cooler section and the rest of the warehouse. In addition, a hole through the insulation enabling the conveyor and any SKUs riding on it to pass through may be in place 120. In other embodiments, the heat insulation may be arranged differently so as to create three or more temperature zones, fewer or more entrances and connections between the different temperature zones may be in place, and doors instead of dress curtains and altogether other forms of insulation may be used.

Figure 2:
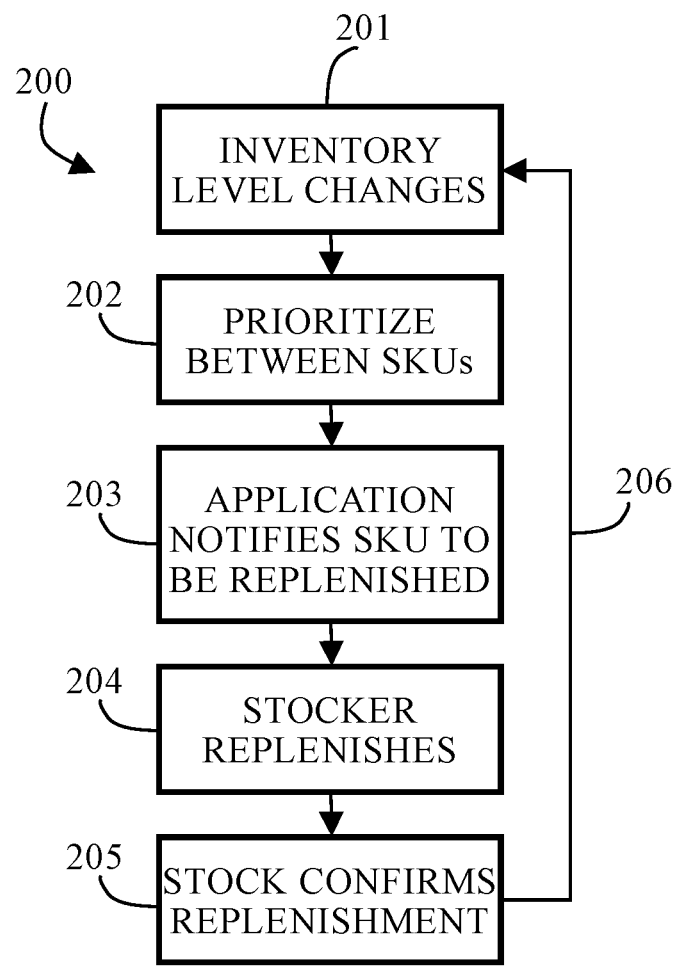
FIG. 2 is a flowchart of the steps involved in stocking SKUs according to an embodiment of the present invention.

FIG. 2 is a flowchart of the steps involved in stocking SKUs according to an embodiment of the present invention 200. An inventory management system 410 tracks inventory levels 102 103 104 105 107 110 201 502 501 and in turn prioritizes between SKUs to be replenished 202 based on the SKUs' depletion levels, the availability of additional units of the SKUs within the supplementary storage space 107 110, the frequency with which the SKUs are projected to be requested within upcoming orders, and the stockers' current locations within the warehouse 100 109 111 162, among other possible considerations. A stocker software application 409 running on a smartwatch or other mobile device worn by the stockers then instructs them to replenish one or more of the prioritized SKUs 203. In instructing the stocker to replenish SKUs, the stocker software application may state the names and include pictures of the SKUs, along with the location coordinates of their canals comprising of a bay number 104 500, a shelf level number 503 504 608 within the bay, and a canal number 601 616 within the shelf level within the bay 205. Stockers then retrieve the requested SKUs from the supplementary storage space 107 110 and load them into the shelves opposite 102 103 104 105 511 601 until the canal for the SKU is filled to the brim 508 204 or until no remaining units of the SKU are left in the supplementary storage space 107 110 204. Upon doing so, stockers then input into the stocker software application that they successfully fulfilled the request 205, whether by manually tapping a button or otherwise, and the process repeats itself for the next SKUs 206. Note that it is upon confirming his fulfilment of the request 205, that to the extent that the stocker is still at the place where he replenished the SKU, his location is relayed to the server 412 410 as part of its process of prioritizing which SKUs to request stockers to replenish 202.

Figure 3:
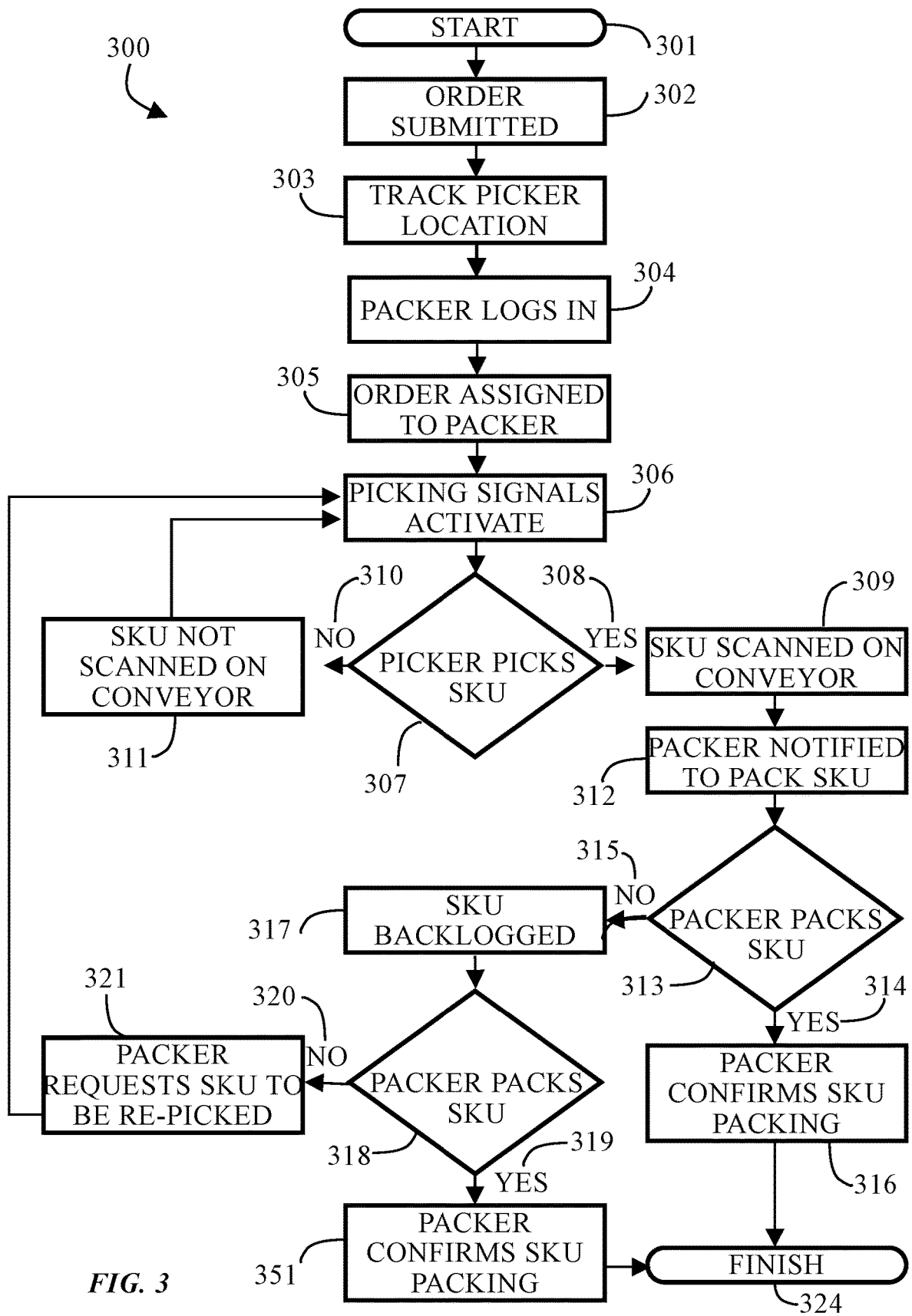
FIG. 3 is a flowchart of the steps involved in picking and packing SKUs according to an embodiment of the present invention.

FIG. 3 is a flowchart of the steps involved in picking and packing SKUs according to an embodiment of the present invention 300. In this example, an order assembly process 301 begins once an order is submitted 302 401. An order may consist of one or more SKUs and of one or more units of each SKU. Trip or motion sensors 509 located at base of the beginning of each shelving bay 500 102 103 104 105 track pickers' 303 111 112 locations. Once a packer logs in to the packer system 304 408, one or more unassigned orders is assigned to him 305. Based on the tracked locations of the pickers, picking signals in the bay ahead of them then get activated for all outstanding or incomplete orders 304, signaling pickers 109 111 as to which SKUs to remove off the shelves of that bay 500 and in what quantities 612. In addition, based on the pickers' tracked locations, any activated picking signals in the bay behind them get turned off and reset 306. Bays ahead and behind the pickers are here defined in terms of the direction of the pickers' path 113 114.

In this example, pickers pick the signaled SKUs 307 612 and place them onto the conveyor 101. A scanner 125 408 towards the end of the conveyor registers the SKUs' barcodes, thereby confirming that the pickers successfully picked the SKUs in question 308. Given that the system 412 tracks where pickers are 303 403, where SKUs are located within the shelves 103 102 104 105 616, and at what speed(s) the conveyor 101 is running, it can anticipate a timeframe within which the SKUs, if successfully picked, should be detected 125 406 as riding on the conveyor 101 704. Therefore, upon not receiving confirmation of the SKUs as riding on the conveyor within that timeframe 311, the server 412 may deduce that the pickers failed to pick the SKUs in question 310. In turn, the system may re-activate the picking signals for those SKUs 612 upon being triggered by the trip sensors 509 just as the next picker is about pass by the bay within which the SKUs are located, or, if there is only one picker, as that same picker passes by the same bay 500 having completed a full cycle around the conveyor 101 113 114. In another embodiment, pickers' locations may be tracked by having them press buttons in various shelving sections, through an ultra-wideband (UWB) real-time location system (RTLS), through computer vision analyzing video footage sent over a camera, or otherwise.

In this embodiment, once a SKU is scanned as riding on the conveyor 309, the packer 116 701 to whose assigned order the SKU belongs, receives a notification 312 through the packer software application 405 707 708 to pack the SKU 313. Confirmation of the packer having successfully packed the SKU 314 may occur through the packer's own manual input into the packer software application 405 707 708, or through a weight sensor 407 711 which tracks and compares the weight resting on the packer's platform 709, or otherwise. In turn, when the packer packs the SKU 314 and a confirmation message of the packer having done so arrives at the server 412 316, then the SKU is considered assembled 324 and the process reiterates itself 301 for the all other SKUs in the order(s) that were assigned to the packer until the orders(s) are fully assembled. In another embodiment, the sorting and packing of SKUs may be done automatically with a pusher sorter, a sliding shoe sorter, a robotic arm, an intelligent conveyor comprising of independently controlled and rotating single wheels such as the Intralox Activate Roller Belt, or otherwise.

In this embodiment, given that the server 412 tracks the location of the scanner or other registering device 125 406 along the conveyor 101, given that it tracks the moment at which SKUs are first registered as riding on the conveyor 101 309, given that it tracks the speed(s) at which the conveyor runs 101, and given that it tracks the distance between the packer stations 116 and the scanner or other registering device that first registered the SKU 125 as riding on the conveyor, it may anticipate a timeframe by which the packer should have successfully packed the SKU. Therefore, in the event that the system 412 does not receive a confirmation of the packer to whose order the SKU belongs as having successfully packed the SKU within that timeframe, it may deduce that the packer failed to pack the SKU 317, in which case the SKU is backlogged within the order 315. This in turn affords the packer a further opportunity to seek out the SKU 318, whether by looking for it at the end of the conveyor 160 where unpacked SKUs accumulate or elsewhere in the warehouse. And if he successfully does find and pack the SKU 351, then by his direct input or otherwise 408, the packer system 408 sends a confirmation message 321 to the server 412, and the SKU is removed from the backlog 317.

In this embodiment, where SKUs have been backlogged 317 but where the packer to whose order the SKUs belong cannot readily find the SKUs in question 320, then he may request the SKUs to be re-picked 321 by tapping a 're-pick' button on the packer software application 408, at which point the SKUs are removed from the backlog 317. In another embodiment, SKUs may be re-picked automatically 318, without any input from the packer, based on whether the SKU has not been confirmed as having been packed past a certain timeframe. Requesting for SKUs to be re-picked 321 makes the picking signals for those SKUs to get re-activated 306 402 412 612 when triggered by a trip sensor 403 509 as the next picker is about to pass through the bay(s) 104 500 where the SKUs are located, so that they can be re-picked, offering the packer another opportunity to pack the SKUs 313 as they ride 704 by on the conveyor 101.

In another embodiment, where there is just one user fulfilling the roles of a picker and a packer in the warehouse, the user is logged in by default as a packer 304 and the upcoming order is assigned to him automatically 305 until he fully picks and assembles it, at which point the next upcoming order is assigned to him. In addition, while SKUs may still be scanned on the conveyor so as to confirm whether all SKUs have been properly picked by him, the scanning function no informs which packer to notify to pack the SKUs. This is because there is just one packer to whose customer order(s) all of the SKUs belong anyways, and also because that user will gather most of the SKUs as they accumulate at the end of the conveyor 160 since he's unable simultaneously, on the one hand, to position himself as a packer 115 116 150 besides the conveyor, fetching SKUs as they ride past him, while on the other hand, simultaneously circling around the conveyor 101, picking SKUs 605 614 off of the shelves 102 103 104 105 500 as a picker 111 109.

Figure 4:
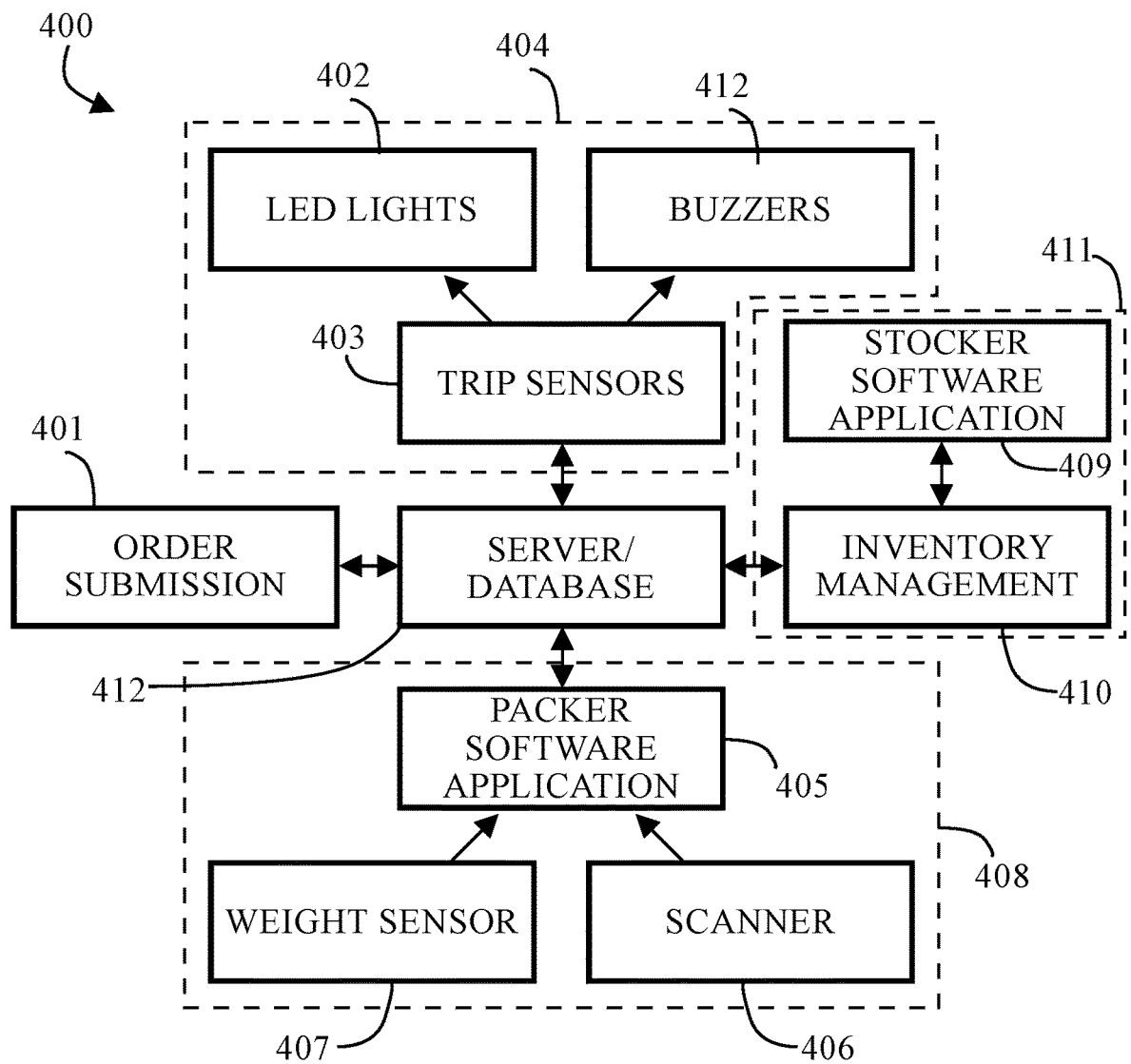
FIG. 4 is a network diagram of relevant software applications and databases according to an embodiment of the present invention.

FIG. 4 is an embodiment of a network diagram of relevant software applications and databases 400. In this example, orders 401 for SKUs are fed to and from a server 412. The server 412 relays that data to one or more microcontrollers such as the Arduino Uno that control the SKU picking signals 610 608 404 in way that is timed thanks to the trip sensors 403 509 which track the pickers' locations and in a way also that is updated in real time with the most recent orders submitted 401. Together these applications and databases support the picking system 404.

In this embodiment, after being removed from a shelf and placed onto a conveyor by pickers 111 109 308, and upon being scanned by a scanner or otherwise detected as riding on the conveyor(s) 125 309 406, SKUs are relayed to a software application 405 running on a monitor 708 that is beside the packer 701 115 116 150. Based on whether the scanned SKU is needed for the order(s) which the packer may be packing, the packer software application 405 sends a notification to the packer 701 to remove the SKU 704 off of the conveyor 101 703 and place it onto his platform 709, thus packing the SKU 312. The notification 312 707 in question may be an image of the SKU 707 with its name, accompanied by a sound, and may be timed to appear on the packer's monitor 708 just as the SKU is about to ride past the packer on the conveyor 101 703, based on a calculation of the speed(s) at which the conveyor system is running 705 and the distance of the packer from the point where the SKU was first scanned 406 309 125. As the packer removes SKUs 704 off of the conveyor 703 and onto his platform 709, he may tap a button in the packer software application 405 708, or alternatively a weight sensor 711 407 connected to the platform 709 may relay any change in weight to the server 412, confirming as appropriate the SKU as having been packed 316. Together these applications and databases support the packer system 408.

In this embodiment, stockers 106 109 wear a smart-watch or some other mobile device which runs a software application 409 that instructs them which SKUs to replenish 700 203 based on an inventory management system 410 201 that tracks inventory levels in the shelves 102 103 104 105 500 and in the supplementary storage area, the number of units of a SKU 615 that can fit within a canal 616 along the shelf depth 615 507, and the availability of additional units in supplementary storage space 107 110. Together these applications and databases support the stocker system 411.

In another embodiment, any LEDs, weight sensors, trip sensors, scanners, may or may not be mediated by a microcontroller, and/or may interact directly with one or more servers, in a communication flow going in other directions. In this or other in embodiments, applications and databases 200 may interact with each other over any communication protocol, computer language, or otherwise, over the internet or otherwise.

Figure 5:
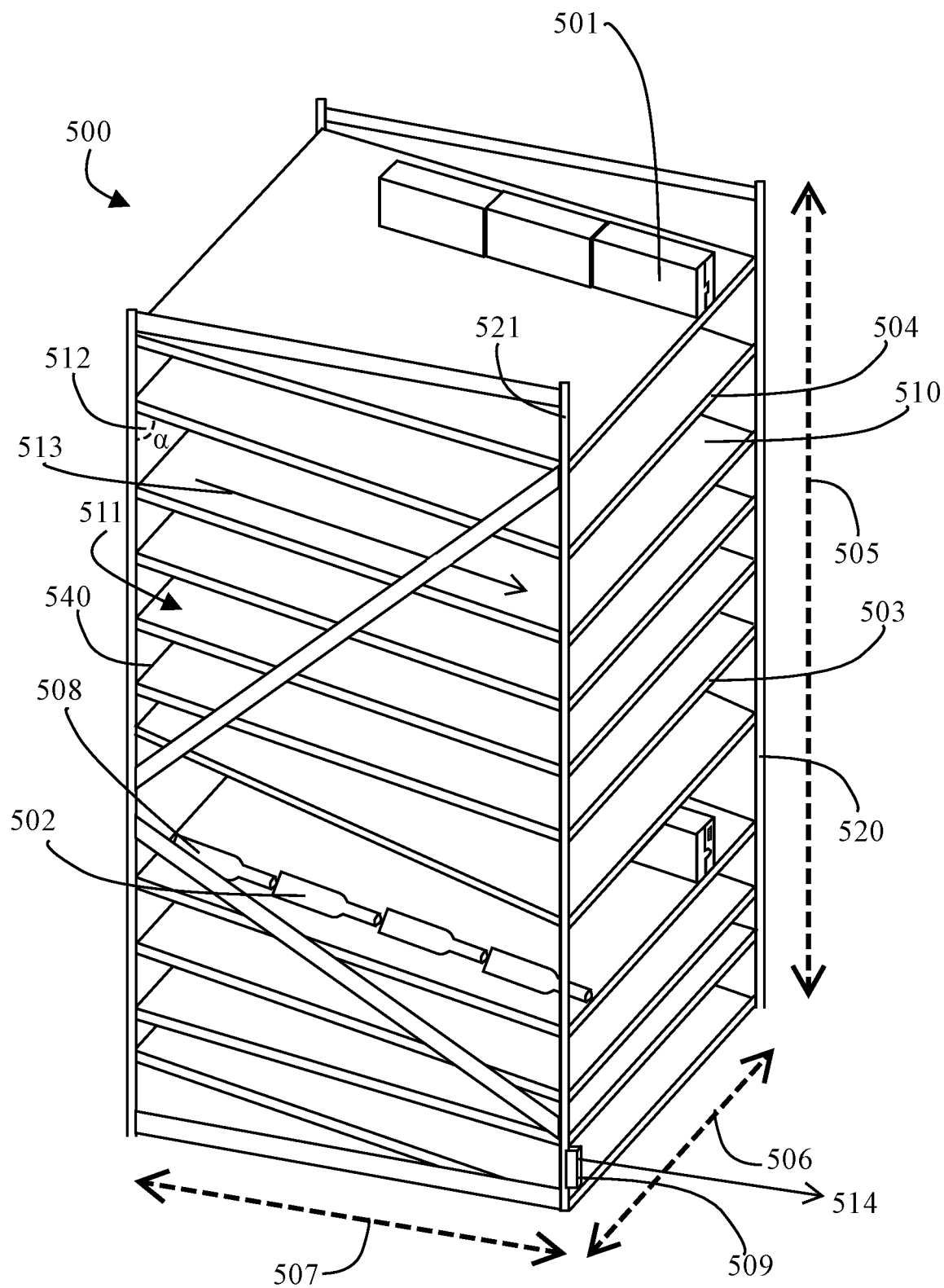
FIG. 5 is a perspective view of a shelving bay according to an embodiment of the present invention.

FIG. 5 is an embodiment of a shelving bay 500. In this example, a shelf bay is 8 ft high 505, 4 ft deep 507, 6 ft feet long 506 and has 11 shelf levels 503 504 510. LED strips 607 line the front of the shelves 504 503, and may have one or more rows of LEDs, which may or may not have a protective silicone sheathing, and which may be attached with glue or otherwise onto the shelf levels.

In this embodiment, front shelf beams 503 504 608 are beneath their corresponding back beams 602 so that shelves 510 603 are downward slanting. The slant angle 512 may vary from virtually flat up to a 40 degree angle, and may be adjusted within a bay with a set depth by raising or lowering the front or back beams, where the boards 510 and any underlying supports are cut to length so as not to extent past the back of the bay 540.

In another embodiment, shelves 510 603 may be sanded or overlaid with a carton flow or other wheeled system enabling SKUs 621 to slide down 513 at a lower shelf angle than otherwise. In addition, in another embodiment, SKUs may be inserted from the front of the shelf, pushing other units of the SKU backwards towards the back of the shelf.

In this embodiment, a laser sensor 509 such as the Waveshare Laser Receiver Module Transmitter Module for Arduino AVR PIC is installed at the bottom part of the first, front 521 upright of the bay, and sends out and receives signals towards the picker lane 168 514, noting any interference caused by pickers passing by. Alternatively, the sensor may consist of a PIR motion sensor or any other obstacle or trip sensor. The first 521 as opposed to second 520 upright is here defined in terms of the direction of the pickers' path 113 114.

Figure 6:
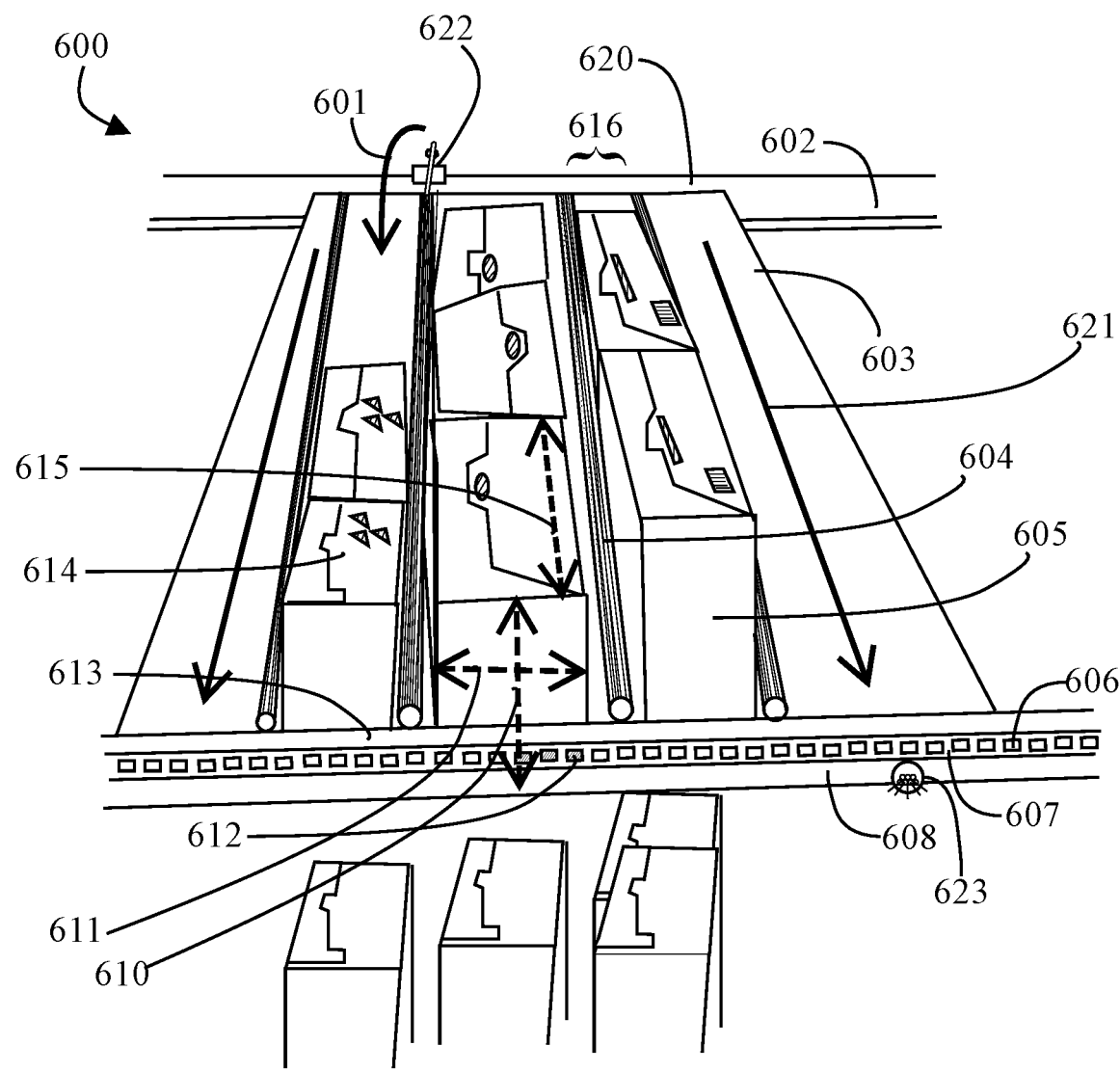
FIG. 6 is a front view of a shelf according to an embodiment of the present invention.

FIG. 6 is an embodiment of a shelf 600. SKUs are loaded 204, one at a time, unit by unit, by stockers 106 109 into their canals 616 from the back of the shelf 511 601 155. SKUs are inserted with their smallest face facing vertically towards the front of the shelf, such that the smallest dimension of the SKU 611 is oriented along the length of the shelf, the second smallest dimension of the SKU 610 is oriented along the height of the shelf, and the longest dimension of the SKU 615 is oriented towards the depth of the shelf. One SKU may have more than one canal 616 reserved for it, across one or more shelf levels 603 510 or bays 500 102 103 104 105.

In this embodiment, wooden dowels 604 ¼ in in diameter and 4 ft long act as dividers, creating the canals 616. The front 608 and back 602 shelf beams may be steel 1 in by 1 in angles with their vertical sides sticking out about 9⁄16 in above the 7⁄16 in thick wooden boards 620 613 of the shelves themselves 603. The dividers 604 may be maintained in place by nailing or otherwise attaching paper clips to the ends of the dividers which then latch onto the sides of the front 613 and back 602 steel angles that vertically stick out 613 620 by about 9⁄16 in 622. Alternatively, plastic L-shaped adhesive separators such as Store Fixtures Direct's 12" L Clear Self Adhesive Plastic Shelf Divider may be used as dividers.

In this embodiment, thanks to the shelf's downward slant 512, SKUs 502 slide towards the front of the shelf 621, accumulating in narrow single files 502 501 614 605 within the canals 616 separated by the dividers 604. The shelves themselves 510 may be may be sanded or overlaid with an aluminum or other sheet so as to adjust the friction of the surface and allow SKUs to slide down smoothly. In addition, as pickers 111 112 remove SKUs out of the shelves 308, SKUs slide automatically forward 621 to the front of the shelf 503 613 by the force of gravity.

In this embodiment, SKUs halt as they reach the front of the shelf 503 613 thanks to the vertical side of the front shelf beam's steel angle that sticks out about 9⁄16 in 613 above the shelf itself 603, blocking SKUs from sliding forward. In another embodiment, paper clips attached to the front of the shelf or 2 in high wooden boards held on by the corner uprights 520 521 of the bay may also act as blockers.

In this embodiment, individually addressable LED strips 606 607 402 signal pickers 111 112 as to which SKUs to pick 306 and in what quantities by lighting up in different colors 612 beneath the SKUs 607 themselves within the part of the shelf aligned with and corresponding to the SKUs' canals 616. So for example, under a summation system where green signifies one and red signifies 5, two green lights may signify two units of the SKU to be picked off of the shelf, a red light followed by a green light followed by another green light may signify 5+1+1=7 units of the SKU to be picked 306 off of the shelf. LED lights may also flash or blink in a trailing way or otherwise animate in brilliant colors right next to the canal of a SKU in need of being picked so as to draw the picker's attention to the SKU 306. In addition, buzzers such as piezo speakers 412 623 dispersed across the front of the bay may make a sound when a SKU near it is in need of being picked 306, also to draw the picker's attention to the SKU. Like the LED strips 608, the buzzers 62 may be glued directly onto the front shelf beam 608 or adhered onto a magnetic strip which in turn attaches itself onto the front shelf beam 608. In another embodiment, pickers may wear a headset or earpiece connected to a mobile or wearable device which vocally instructs the picker 111 112 as to which SKUs to pick 306 404 and in what quantities.

Figure 7:
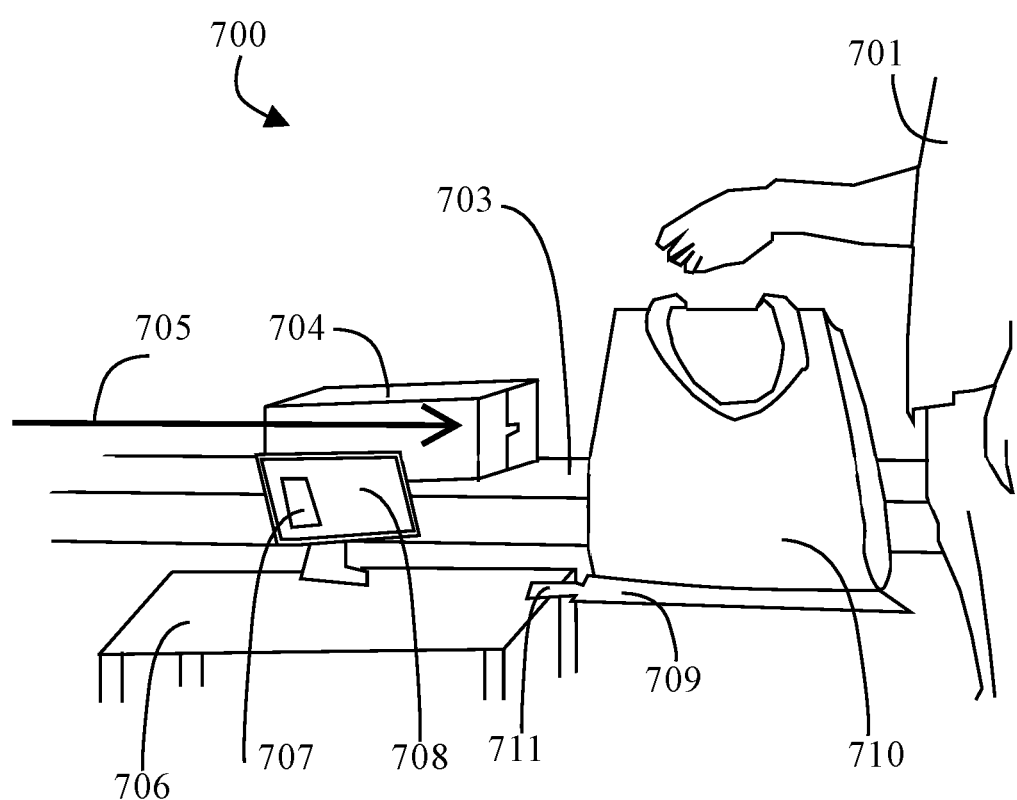
FIG. 7 is a side view of a packer according to an embodiment of the present invention.

FIG. 7 is an embodiment of a packer 700. In this example, beside a packer 701 115 116 150 is a software application 405 707 running on a monitor 708 which pops up images or names of SKUs that have been scanned or registered 406 125 309 as riding on the conveyor 101 703, notifying the packer to remove the SKUs off of the conveyor 312 whenever the SKUs 704 belongs to an order that was assigned to the packer 305. The timing which with the notifications pop up may be based on packers' 115 116 distance from the scanner 125 and the speed at which the conveyor system 101 is running 133 705, so that the notifications pop up just as the SKUs are about to ride past the packers.

In this embodiment, upon removing SKUs 314 319 the packer place them onto a platform 709 right next to him which may have a bag 710 or container on it and into which the SKUs may be bagged directly. The platform may be connected to a weight sensor 711 407 in the form of a load cell such as an Uxcell a14071900ux0057 10 Kg Aluminium Alloy Electronic Scale Load Cell Weighting Sensor, which continually registers any changes in weight, and may in turn determine whether the packer successfully removed the instructed SKUs by comparing their anticipated weights 412 with the observed weight changes 407. When a packer is not instructed to remove a SKU 704 off of the conveyor 703 101, he may just let the SKU ride past him, so that a packer behind him, to whose order the SKU may belong, may pack the SKU upon being notified to do so through his monitor 708. In other embodiments, one or more weight sensors which may be 3-wired half-bridge electronic sensors such as a the Uxcell 4Pcs 50 kg 110 lb, 3-Wired Half-Bridge Electronic Weighing Sensor, may be placed beneath the packers' platforms 709 or elsewhere 706, registering any weight changes in that way.

It will be apparent to one with skill in the art that the method and system for stocking and assembling SKUs described herein may be provided using some or all of the mentioned features and components without departing from the spirit and scope of the present invention. It will also be apparent to the skilled professional that the embodiments described above are specific examples of a single broader invention that may have greater scope than any of the singular descriptions taught. There may be many alterations made in the descriptions without departing from the spirit and scope of the present invention.

What is claimed is:

1. A method and system for stocking and assembling SKUs, comprising:

stocking said SKUs out of a lane, from the back of a downward slanting shelf, unit by unit, in long, narrow, single files separated by dividers, with supplementary storage space available ten or fewer feet away from behind the lane and where at least some SKUs of said SKUs are stocked including from within cases in which they were originally brought in to the warehouse;

picking products represented by said at least some SKUs for multiple orders simultaneously off of shelves and onto a conveyor, resulting in products represented by said at least some SKUs from different orders being mixed up together while riding on the conveyor;

scanning or otherwise registering all of said SKUs which are represented of said products which are riding on the conveyor;

sorting and packing products represented by said SKUs upon receiving notifications to do so as said products ride on the conveyor;

characterized in such a way that after being brought to the stocking lane or supplementary storage space, said products represented by said SKUs are stocked into the shelves, picked off of the shelves and onto the conveyor, and then scanned or otherwise registered as riding on the conveyor, at which point timed notifications lead said products represented by said SKUs riding on the conveyor to be sorted and packed into orders and then said orders being confirmed as being fully assembled;

wherein a location of pickers directed to carry out said step of picking are tracked at regular intervals throughout a course of each said pickers' picking, triggering bays ahead of each said pickers' path to activate picking signals for products represented by said SKUs encompassing most recent submitted orders, and triggering bays behind said pickers' to be turned off and reset.

2. The method and system of claim 1, wherein most SKUs are oriented with their smallest face facing vertically towards the front of the shelves when stocked.

3. The method and system of claim 1, wherein SKUs slide down the shelves without recourse to any wheeled system, but off of the surface of the shelves themselves or any other flat materials overlaying them.

4. The method and system of claim 1, wherein stockers are guided as to what SKUs to replenish and are able to input whether they successfully replenished the SKUs thanks to a software application running on a smartwatch attached to their body or clothing.

5. The method and system of claim 1, wherein pickers and stockers seamlessly cross different temperature zones.

6. The method and system of claim 1, wherein SKUs ride directly on the conveyor belt.

7. The method and system of claim 1, wherein pickers walk in circles around the conveyor spaced more or less evenly apart from each other.

8. The method and system of claim 7, wherein pickers seamlessly cross different temperature zones within a single picking cycle.

9. The method and system of claim 8, where the picking signals comprise of LED strips with individually controllable LEDs which light up in different colors under a summation system to indicate which SKUs to pick off of the shelves and in what quantities.

10. The method and system of claim 9 wherein the LED strips further comprise trailing animations to draw pickers' attention.

11. The method and system of claim 1, wherein the warehouse fits within a 4,000 square foot space.

12. The method and system of claim 1, where orders are submitted by customers shopping in a retail store in real-time.

13. The method and system of claim 1, wherein the SKUs comprise of grocery items which include liquid and semi-solid items as well as circular and fragile items.

14. The method and system of claim 1, wherein the average size of orders packed by packers average 8 or more different SKUs.

15. The method and system of claim 1, wherein weight sensors track the weights resting on said packers' platforms and compare any weight changes to the weight changes anticipated from the packers' actions, to evaluate whether packers' successfully complete their tasks.

16. The method and system of claim 1, wherein packers can request SKUs to be re-picked.

\* \* \* \* \*